United States Defensive Publication [19] (H) [11] T986,003

Barrier [43] Sep. 4, 1979

[54] METHOD FOR CONTROLLING HERBACEOUS WEEDS

[76] Inventor: George E. Barrier, 1 Wedgewood Dr. Fairville Hills, Chadds Ford, Pa. 19317

[21] Appl. No.: 13,121

[22] Filed: Feb. 21, 1979

[51] Int. Cl.[2] ..... A01N 9/36

[52] U.S. Cl. ..... 71/86; 71/87

[57] ABSTRACT

This invention relates to the control of herbaceous weeds such as bindweed, maidencane, arrowhead and sedges by applying to the locus of the weeds a compound selected from compounds having the following formula

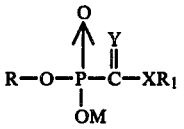

where

R is alkyl of 1 to 3 carbon atoms, allyl or benzyl;

$R_1$ is M, alkyl of 1 to 3 carbon atoms, alkenyl of 3 to 4 carbon atoms or benzyl;

M is lithium, sodium, potassium or ammonium;

X is oxygen or sulfur; and

Y is oxygen or sulfur with the proviso that when Y is sulfur, X is sulfur.

9 Claims, No Sheets Drawing,

21 Pages Specification

The file of this unexamined application may be inspected and copies thereof may be purchased (849 O.G. 1221, Apr. 9, 1968).